(12) United States Patent
Lim

(10) Patent No.: US 11,954,349 B2
(45) Date of Patent: Apr. 9, 2024

(54) MEMORY SYSTEM FOR EXECUTING A TARGET OPERATION BASED ON A PROGRAM STATE OF A SUPER MEMORY BLOCK AND OPERATING METHOD THEREOF

(71) Applicant: SK hynix Inc., Gyeonggi-do (KR)

(72) Inventor: Young Soo Lim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 52 days.

(21) Appl. No.: 17/740,437

(22) Filed: May 10, 2022

(65) Prior Publication Data

US 2023/0195343 A1 Jun. 22, 2023

(30) Foreign Application Priority Data

Dec. 21, 2021 (KR) ........................ 10-2021-0183929

(51) Int. Cl.
*G06F 3/06* (2006.01)
*G06F 1/3296* (2019.01)

(52) U.S. Cl.
CPC ............ *G06F 3/064* (2013.01); *G06F 1/3296* (2013.01); *G06F 3/0604* (2013.01); *G06F 3/0673* (2013.01)

(58) Field of Classification Search
CPC .... G06F 3/0634; G06F 1/3296; G06F 3/0604; G06F 3/0673
See application file for complete search history.

(56) References Cited

U.S. PATENT DOCUMENTS

| 10,310,930 B2* | 6/2019 | Zhou ................... G06F 12/0246 |
| 2012/0023365 A1* | 1/2012 | Byom ................. G06F 11/2094 |
| | | 711/E12.001 |
| 2014/0013137 A1* | 1/2014 | Wilson ..................... G06F 1/32 |
| | | 713/323 |
| 2022/0254434 A1* | 8/2022 | Yeung .................... G11C 29/88 |
| 2022/0269440 A1* | 8/2022 | Lin ....................... G06F 3/0679 |

FOREIGN PATENT DOCUMENTS

| KR | 10-2117919 B1 | 6/2020 |
| KR | 10-2020-0113992 A | 10/2020 |

* cited by examiner

*Primary Examiner* — Mark A Giardino, Jr.
(74) *Attorney, Agent, or Firm* — IP & T GROUP LLP

(57) ABSTRACT

The embodiments of the present disclosure relate to a memory system and operating method thereof. According to embodiments of the present disclosure, the memory system may include i) a memory device including a plurality of memory blocks each including a plurality of pages, and ii) a memory controller configured to monitor a program operation on a first super memory block among a plurality of super memory blocks each including at least one of the plurality of memory blocks, and execute a target operation on the first super memory block based on the state of the first super memory block when it is determined that the program operation on the first super memory block has not been executed for a preset time period from a preset reference time point.

18 Claims, 15 Drawing Sheets

MEMORY SYSTEM FOR EXECUTING A TARGET OPERATION BASED ON A PROGRAM STATE OF A SUPER MEMORY BLOCK AND OPERATING METHOD THEREOF

CROSS-REFERENCES TO RELATED APPLICATION

The present application claims priority under 35 U.S.C. 119(a) to Korean patent application number 10-2021-0183929 filed on Dec. 21, 2021, which is incorporated herein by reference in its entirety.

TECHNICAL FIELD

The embodiments of the present disclosure relate to a memory system for executing a target operation based on a program state of a super memory block and operating method thereof.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

The memory system may write data to a memory block included in the memory device. In this case, the memory block to which data is written may include one or more erased pages to which new data can be written.

SUMMARY

Embodiments of the present disclosure may provide a memory system and operating method thereof, capable of preventing the degrading of the reliability of data stored in a memory block when the memory block remains for a long time.

In one aspect, an embodiment of the present disclosure may provide a memory system including i) a memory device including a plurality of memory blocks each including a plurality of pages, and ii) a memory controller configured to monitor a program operation on a first super memory block among a plurality of super memory blocks each including at least one of the plurality of memory blocks, and execute a target operation on the first super memory block based on the state of the first super memory block when it is determined that the program operation on the first super memory block has not been executed for a preset time period from a preset reference time point.

In another aspect, an embodiment of the present disclosure may provide an operating method of a memory system, the operating method may include i) monitoring a program operation on a first super memory block among a plurality of super memory blocks each including at least one of a plurality of memory blocks each including a plurality of pages, ii) determining whether the program operation for the first super memory block is executed for a preset time period from a preset reference time point, and iii) executing a target operation on the first super memory block based on the state of the first super memory block when it is determined that the program operation on the first super memory block has not been executed for the preset time period from the preset reference time point.

In this case, the target operation is i) an operation of migrating, to the first super memory block, a valid data unit of a preset size stored in a second super memory block among the plurality of super memory blocks, ii) an operation of migrating, to all erased pages included in the first super memory block, all or a part of valid data stored in the second super memory block, or iii) an operation of migrating, to the second super memory block, all valid data stored in the first super memory block.

According to embodiments of the present disclosure it is possible to prevent the degrading of the reliability of data stored in a memory block when the memory block remains for a long time.

DETAIL DESCRIPTION

Figure 1:
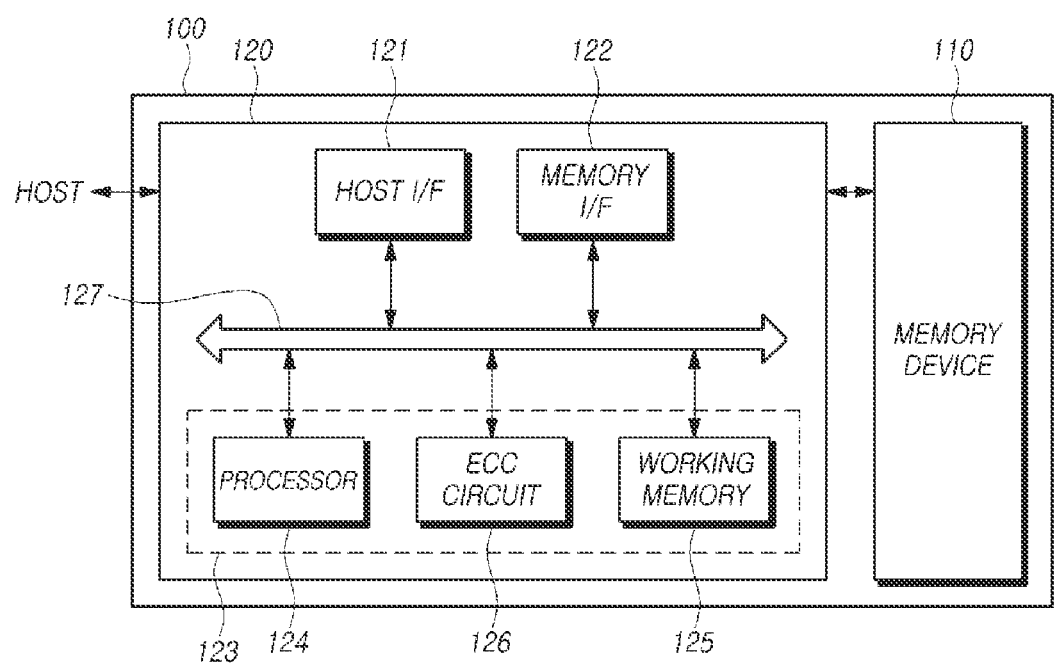
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation also referred to as a "write operation", an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all read data in this manner, the error detection/correction circuit 126 may acquire information as to which sector is deemed uncorrectable in the read data. The error detection/correction circuit 126 may provide such information e.g., address of uncorrectable bits, to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
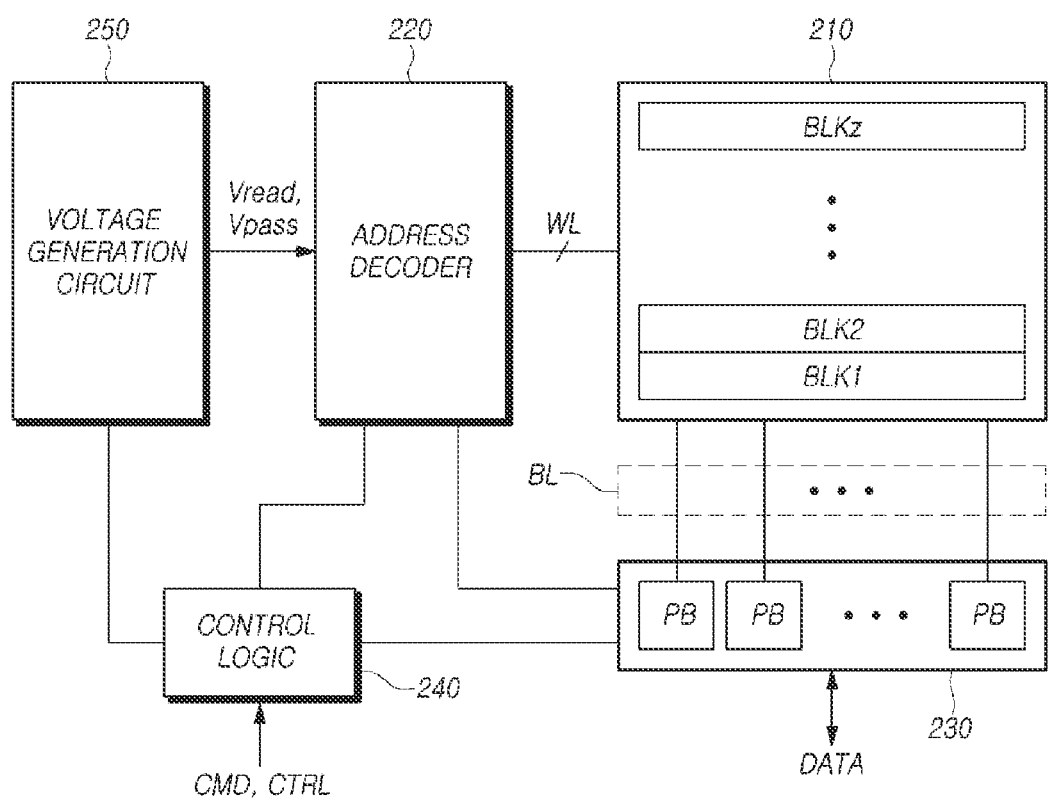
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or greater than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line also referred to as a source selection line or a drain selection line, may be additionally arranged outside the first outermost word line, which is closer to the read/write circuit 230 among two outermost word lines, and a second selection line also referred to as a drain selection line or a source selection line, may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
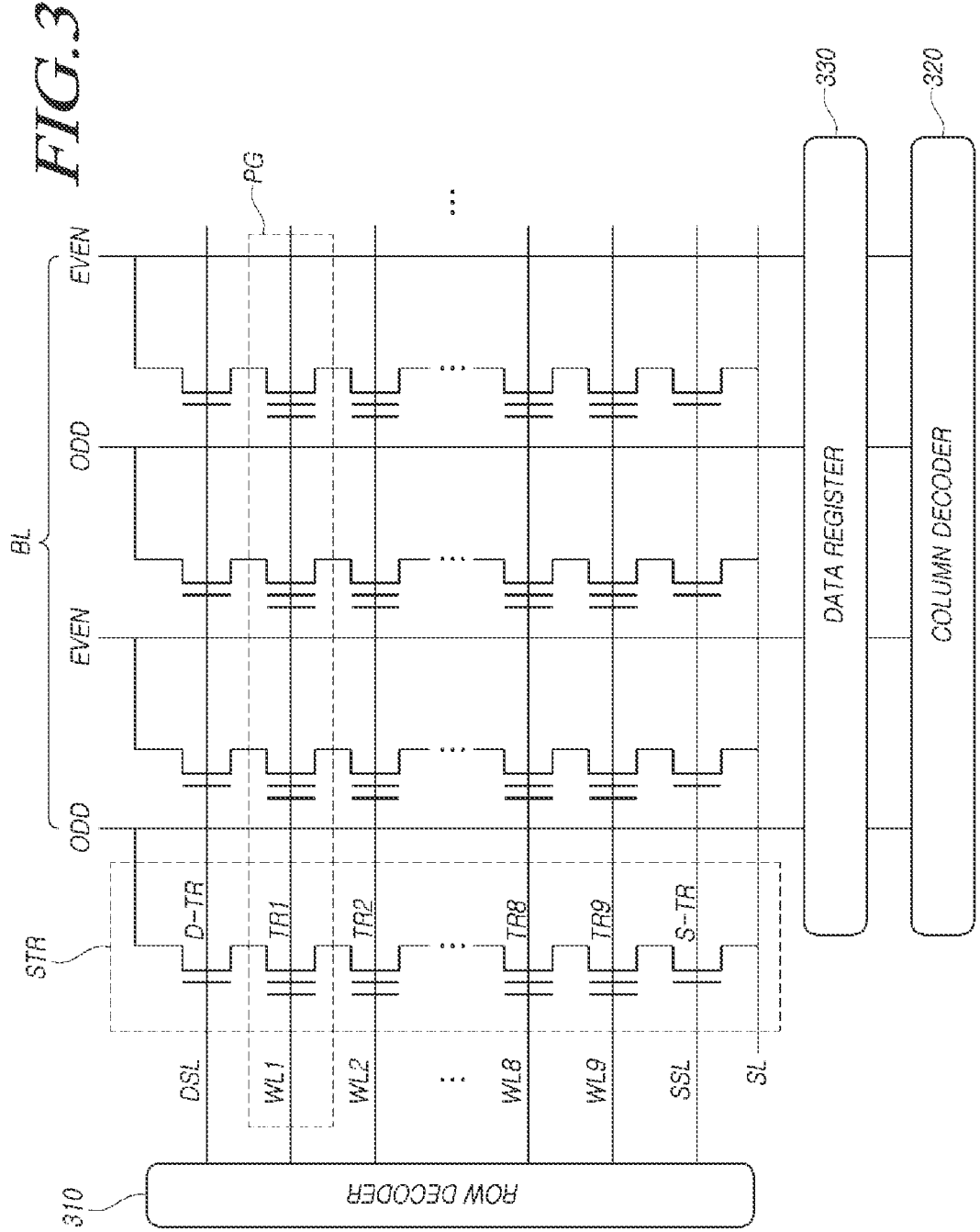
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area which is the remaining area other than the core area, and includes circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two e.g., two or four, pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
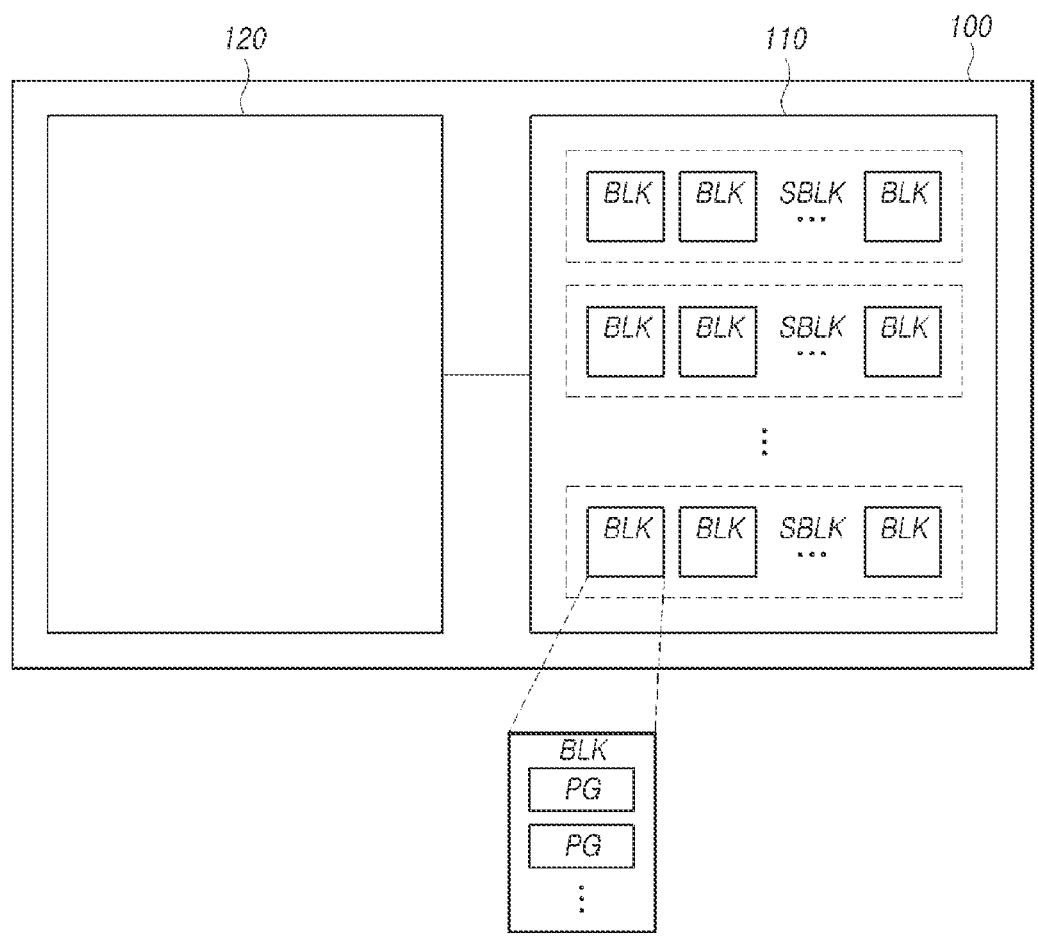
FIG. 4 illustrates a schematic structure of the memory system according to embodiments of the present disclosure.

FIG. 4 illustrates a schematic structure of the memory system 100 according to embodiments of the present disclosure.

Referring to FIG. 4, the memory system 100 may include a memory device 110 and a memory controller 120.

In FIG. 4, the memory device 110 may include a plurality of memory blocks BLK. In this case, each of the plurality of memory blocks BLK may include a plurality of pages PG.

In addition, the memory controller 120 may group a plurality of memory blocks BLK included in the memory device 110 into a plurality of super memory blocks SBLK. In this case, each of the super memory blocks SBLK may include one or more of the plurality of memory blocks BLK included in the memory device 110.

Moreover, the memory device 110 may include a plurality of memory dies (not shown), and each of the plurality of memory dies (not shown) may include a plurality of planes (not shown). In this case, the memory blocks BLK included in a same super memory block SBLK may be located on different memory dies or on different planes of the same memory die.

Figure 5:
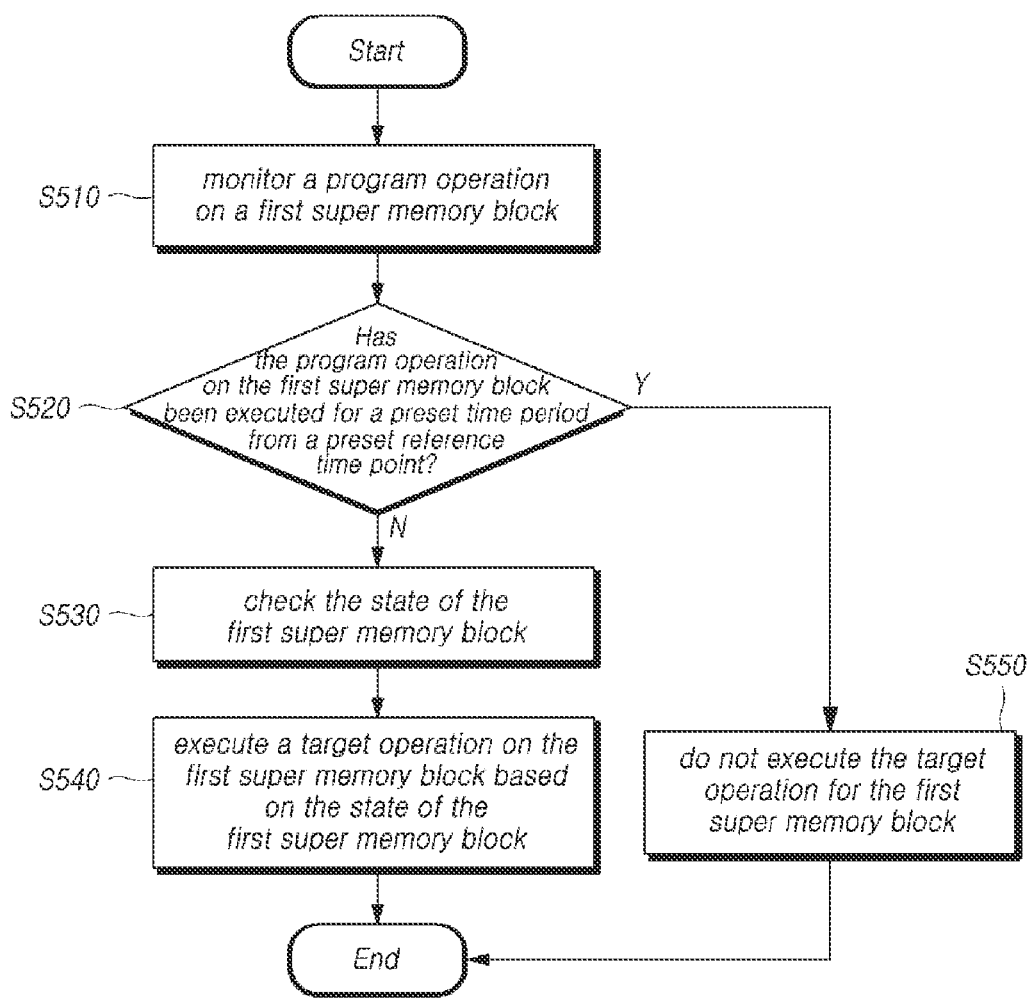
FIG. 5 illustrates an example of operation of the memory system according to embodiments of the present disclosure.

FIG. 5 illustrates an example of operation of the memory system 100 according to embodiments of the present disclosure.

Referring to FIG. 5, the memory controller 120 of the memory system 100 may monitor a program operation on a first super memory block SBLK_1 among the plurality of super memory blocks SBLK (S510).

In this case, the first super memory block SBLK_1 may be an open super memory block including one or more erased pages. Data may be programmed (written) in an erased page included in the first super memory block SBLK_1. The erased page may also be referred to as an empty page, a free page or an available page.

The memory controller 120 may determine that the program operation on the first super memory block SBLK_1 has been executed for a preset time period from a preset reference time point (S520).

For example, the aforementioned time period may be a predetermined value or a value designated by an external device (e.g. host HOST) of the memory system 100. The length of the aforementioned time period may be changed according to a wear-out state of the memory device 110. Also it may be changed according to the mode (e.g. SLC mode, MLC mode, TLC mode, QLC mode) of the memory cells included in the memory blocks included in the first super memory block SBLK_1.

For example, the memory controller 120 may determine whether a program operation on the first super memory block SBLK_1 is executed by checking the location of last data-programmed page in the first super memory block SBLK_1 at preset intervals.

If the location of last data-programmed page in the first super memory block SBLK_1 is changed, the memory controller 120 may determine that the program operation on the first super memory block SBLK_1 has been executed.

On the other hand, if the location of last data-programmed page in the first super memory block SBLK_1 is not changed, the memory controller 120 may determine that the program operation on the first super memory block SBLK_1 has not been executed.

When it is determined that the program operation on the first super memory block SBLK_1 has not been executed for the preset time period from the preset reference time point (S520-N), the memory controller 120 may check the state of the first super memory block SBLK_1 (S530).

For example, the state of the first super memory block SBLK_1 may be a state of data stored in the first super memory block SBLK_1 (e.g. size of data, attribute of data) or a state of the memory blocks BLK and the pages PG included in the first super memory block SBLK_1 (e.g. the number of erased pages, the number of pages in which valid data is stored).

For another example, the state of the first super memory block SBLK_1 may be a pattern in which data is programmed in the first super memory block SBLK_1, e.g. sequential program pattern.

The memory controller 120 may execute a target operation on the first super memory block SBLK_1 based on the state of the first super memory block SBLK_1 checked in operation S530 (S540).

In the embodiments of the present disclosure, the memory controller 120 may prevent, by executing the target operation on the first super memory block SBLK_1, a problem in which reliability of data stored in the first super memory block SBLK_1 is degraded since the program operation for the first super memory block SBLK_1 is not executed for the preset time period from the preset reference time point.

As the time in which open state, a state that data is not programmed in some of the pages PG included in the first super memory block SBLK_1, is maintained increases, there is a high possibility that a problem occurs in the reliability of data stored in the first super memory block SBLK_1.

In general, a method of changing the first super memory block SBLK_1 to a closed state is used to solve the aforementioned problem. When the first super memory block SBLK_1 becomes a closed state, only pages in which valid data or invalid data is stored exist in the first super memory block SBLK_1 and no erased pages exist in the first super memory block SBLK_1.

However, there is a case in which the memory system 100 cannot arbitrarily change the first super memory block SBLK_1 to the closed state. For example, when the total size of data to be programmed in the first super memory block SBLK_1 is set and a position where new data is to be programmed in the first super memory block SBLK_1 is set, the performance of the first super memory block SBLK_1 may be degraded if the memory system 100 arbitrarily changes the first super memory block SBLK_1 to the closed state.

In addition, since the memory system 100 needs to perform an additional operation to prevent a problem that occurs when the first super memory block SBLK_1 is changed to the closed state, the complexity of the operation of maintaining and managing the super memory blocks SBLK by the memory system 100 may increase.

Accordingly, in the embodiments of the present disclosure, the memory controller 120 may execute an appropriate target operation according to the state of the first super memory block SBLK_1. Through this, the memory controller 120 may prevent a problem in which performance is degraded and maintenance complexity increase, and reliability of data stored in the first super memory block SBLK_1 is degraded.

After the target operation is executed in operation S540, the memory controller 120 may additionally program write-requested data from the outside of the memory system 100 (e.g. host HOST) into an erased page included in the first super memory block SBLK_1.

On the other hand, when it is determined that the program operation on the first super memory block SBLK_1 has been executed for the preset time period from the preset reference time point (S520-Y), the memory controller 120 may not execute the target operation for the first super memory block SBLK_1 (S550).

Hereinafter, specific embodiments of the above-described target operation will be described with reference to FIGS. 6 to 8.

Figure 6:
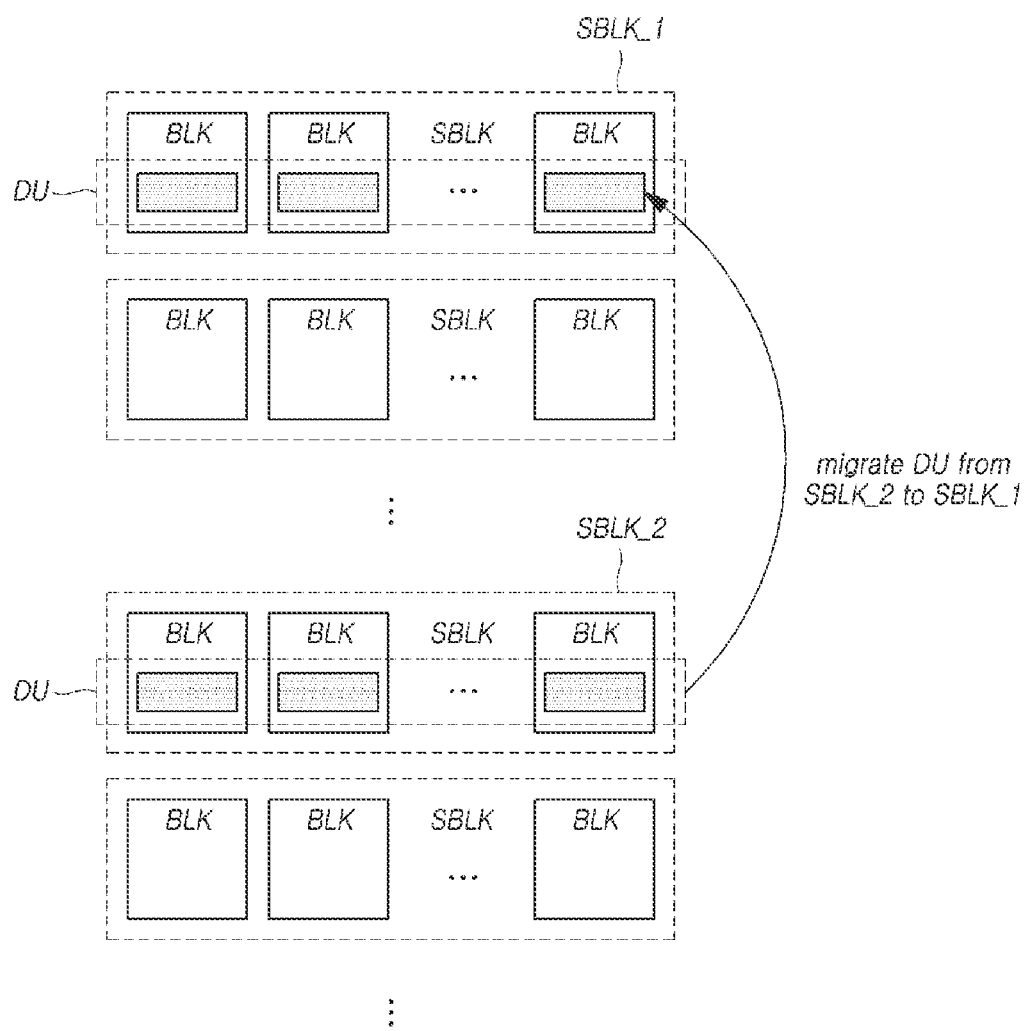
FIG. 6 illustrates an example of the memory system executing a target operation according to embodiments of the present disclosure.

FIG. 6 illustrates an example of the memory system executing a target operation according to embodiments of the present disclosure.

Referring to FIG. 6, for example, the target operation may be an operation of migrating a valid data unit DU of a preset size, which is stored in a second super memory block SBLK_2 among the plurality of super memory blocks SBLK, to the first super memory block SBLK_1.

Data included in the valid data unit DU may be valid data. That is, invalid data may not be migrated from the second super memory block SBLK_2 to the first super memory block SBLK_1.

The size of valid data unit DU may be, for example, a multiple of the size of the page PG included in the second super memory block SBLK_2.

In FIG. 6, a case in which the valid data units DU are distributed and stored in all of the memory blocks BLK included in the second super memory block SBLK_2 is illustrated as an example. However, in the embodiments of the present disclosure, the valid data units DU are not necessarily distributed and stored. The valid data units DU may be stored in a distributed manner in only a portion of the memory blocks BLK included in the second super memory block SBLK_2 or in only one of the memory blocks BLK included in the second super memory block SBLK_2.

The memory controller 120 may execute the target operation to migrate a valid data unit DU of a preset size stored in the second super memory block SBLK_2 among the plurality of super memory blocks SBLK to the first super memory block SBLK_1. Through this, it is possible to prevent a problem in reliability of data stored in a page in which data was last programmed in the first super memory block SBLK_1.

Also, the memory controller 120 may prevent a problem of consuming some of the pages PG included in the first super memory block SBLK_1 to store dummy data, by migrating the valid data unit DU stored in the second super memory block SBLK_2 to the first super memory block SBLK_1 instead of programming the dummy data in the first super memory block SBLK_1.

Figure 7:
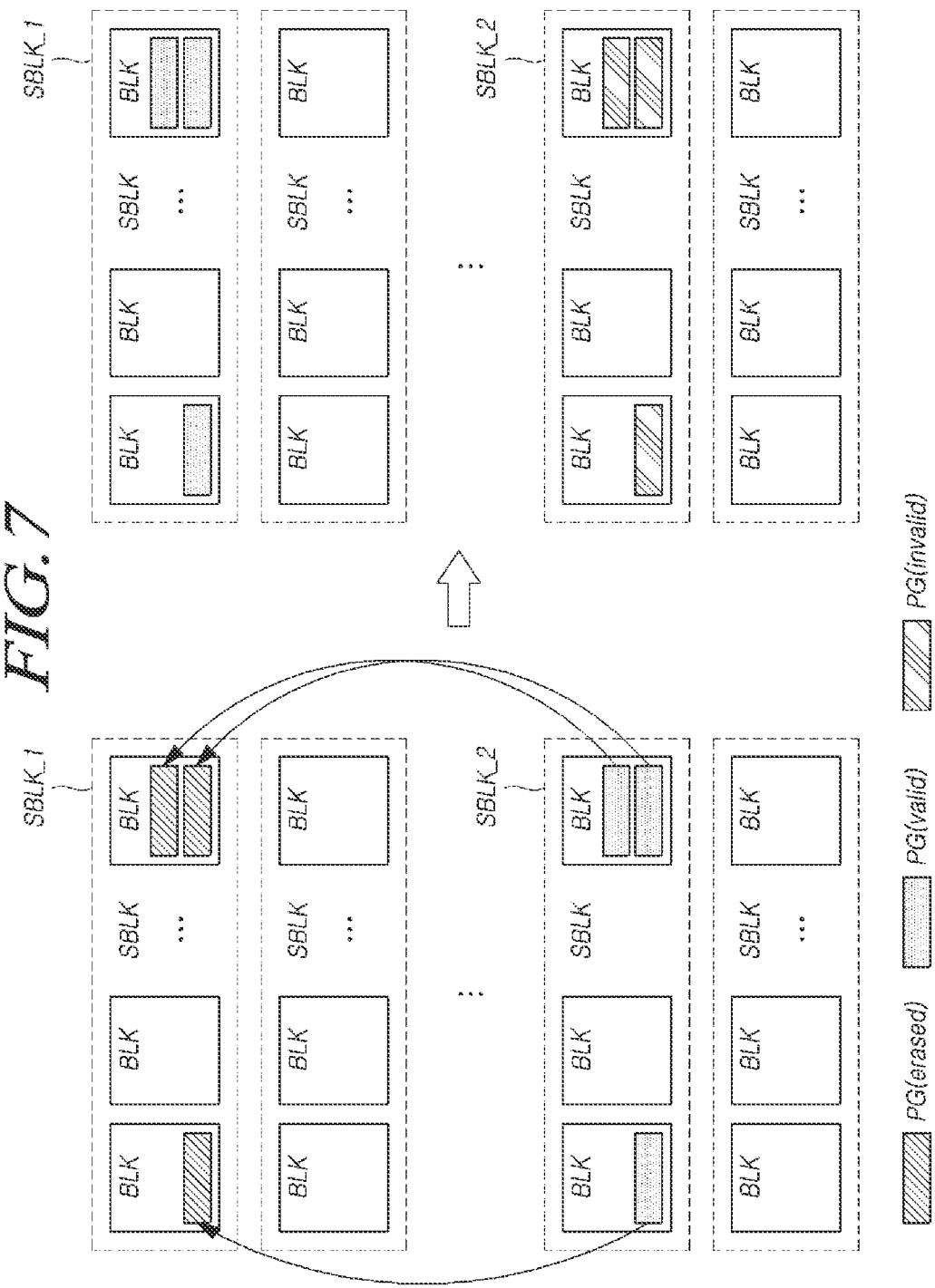
FIG. 7 illustrates another example of the memory system executing a target operation according to embodiments of the present disclosure.

FIG. 7 illustrates another example of the memory system executing a target operation according to embodiments of the present disclosure.

Referring to FIG. 7, for another example, the target operation may be an operation of migrating all or a part of valid data stored in the second super memory block SBLK_2 to all erased pages included in the first super memory block SBLK_1.

Referring to FIG. 7, valid data stored in one of the pages PG included in the second super memory block SBLK_2 may be migrated to one of the erased pages included in the first super memory block SBLK_1. In this case, an erased page included in the first super memory block SBLK_1 may be converted into a valid page, and a valid page included in the second super memory block SBLK_2 may be converted into an invalid page.

The memory controller 120 may perform a target operation to migrate all or a part of valid data stored in the second super memory block SBLK_2 to all erased pages included in the first super memory block SBLK_1.

In this case, the first super memory block SBLK_1 is in a closed state in which no more erased pages exist. Accordingly, there is no problem in that reliability of data stored in the first super memory block SBLK_1 is degraded because of the first super memory block SBLK_1 remaining open.

In order to write valid data to all erased pages included in the first super memory block SBLK_1, the size of valid data included in the second super memory block SBLK_2 is greater than or equal to the sum of sizes of all erased pages included in the first super memory block SBLK_1.

Figure 8:
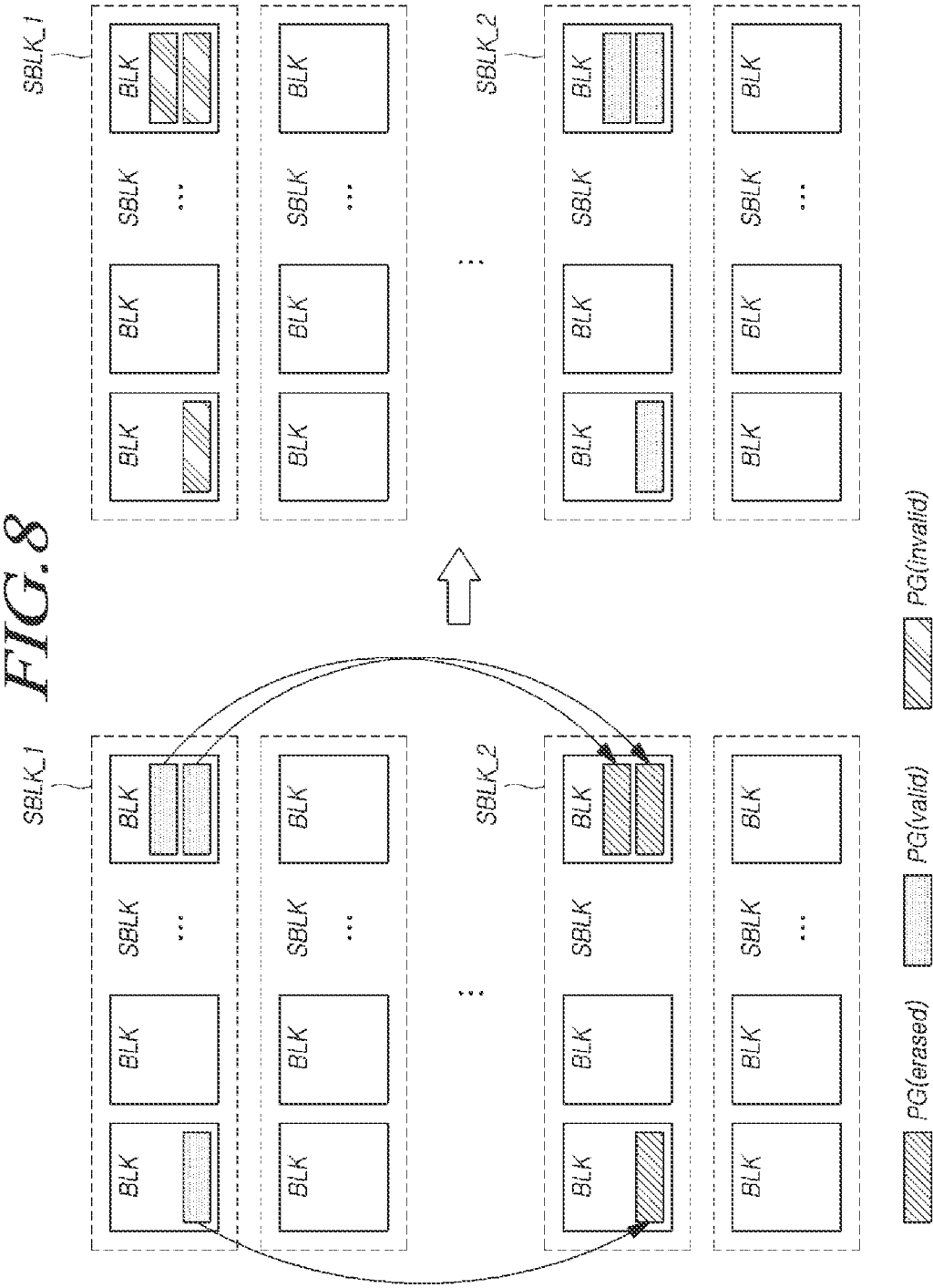
FIG. 8 illustrates another example of the memory system executing a target operation according to embodiments of the present disclosure.

FIG. 8 illustrates another example of the memory system 100 executing a target operation according to embodiments of the present disclosure.

Referring to FIG. 8, for another example, the target operation may be an operation of migrating all valid data stored in the first super memory block SBLK_1 to the second super memory block SBLK_2.

In FIG. 8, valid data stored in pages included in the first super memory block SBLK_1 may be migrated to an erased page included in the second super memory block SBLK_2. In this case, a page, in which valid data is stored, included in the first super memory block SBLK_1 becomes a page in which invalid data is stored, and an erased page included in the second super memory block SBLK_2 becomes a page in which valid data is stored.

When the target operation described with reference to FIG. 8 is executed, the first super memory block SBLK_1 enters a state in which valid data is no longer stored. Accordingly, the memory controller 120 does not need to maintain reliability of data stored in the first super memory block SBLK_1. In addition, the memory controller 120 may additionally secure a space for storing data by erasing the first super memory block SBLK_1.

Figure 9:
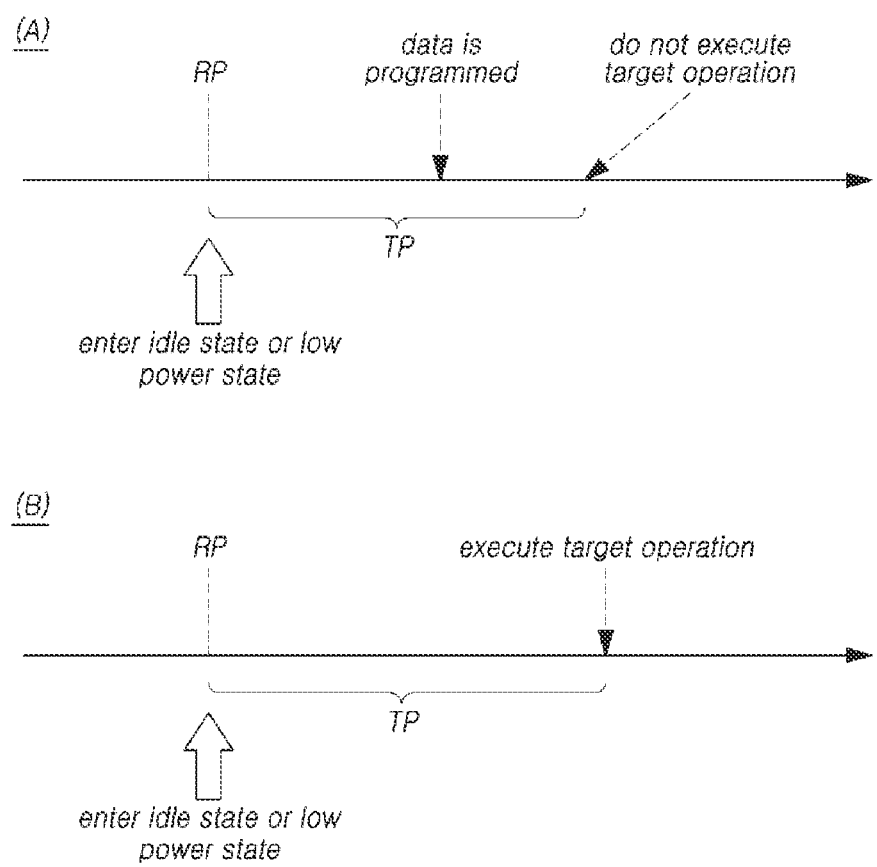
FIG. 9 illustrates an example of a reference time point used by the memory system to determine whether the target operation is executed according to embodiments of the present disclosure.

FIG. 9 illustrates an example of a reference time point used by the memory system 100 to determine whether the target operation is executed according to embodiments of the present disclosure.

In FIG. 9, the memory controller 120 of the memory system 100 may set the reference time point RP as 1) a time point at which the memory system 100 enters an idle state or 2) a time point at which the memory system enters a low power mode.

For example, the idle state may refer to a state in which an operation or reading data from the memory device 110, an operation of writing data to the memory device 110 and an operation of erasing the memory block BLK included in the memory device 110 are not performed.

For example, the low power mode may refer to a state in which the memory system 100 operates to consume power below a preset threshold power. In the low power mode, some functions of the memory system 100 may be deactivated. The low power mode may be referred to as a sleep mode or a power saving mode.

When the program operation for the first super memory block SBLK_1 is executed within the time period TP from the reference time point RP, the memory controller 120 does not execute a target operation on the first super memory block SBLK_1 (A).

When the program operation for the first super memory block SBLK_1 is not executed within the time period TP from the reference time point RP, the memory controller 120 may execute a target operation on the first super memory block SBLK_1 based on a state of the first super memory block SBLK_1 (B).

Figure 10:
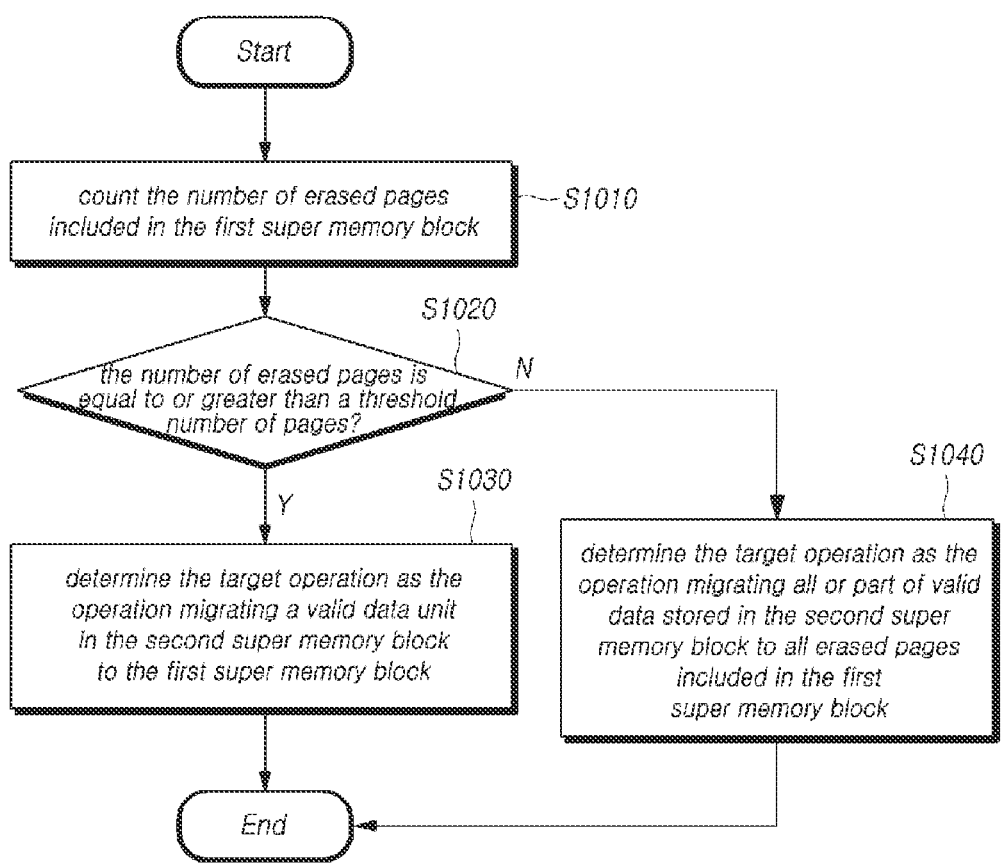
FIG. 10 illustrates a flow chart for the memory system to determine the target operation according to embodiments of the present disclosure.

FIG. 10 illustrates a flow chart for the memory system 100 to determine the target operation according to embodiments of the present disclosure.

Referring to FIG. 10, the memory controller 120 of the memory system 100 may count the number of erased pages included in the first super memory block (S1010).

The memory controller 120 determines whether the number of erased pages counted in operation S1010 is equal to or greater than a set threshold number of pages (S1020).

When the counted number of erased pages is greater than or equal to the threshold number of pages (S1020-Y), the memory controller 120 may determine the target operation as the operation of migrating a valid data unit DU in the second super memory block SBLK_2 to the first super memory block SBLK_1 (51030).

On the other hand, when the counted number of erased pages is less than the threshold number of pages (S1020-N), the memory controller 120 may determine the target operation as the operation of migrating all or a part of valid data stored in the second super memory block SBLK_2 to all erased pages included in the first super memory block SBLK_1 (S1040).

Figure 11:
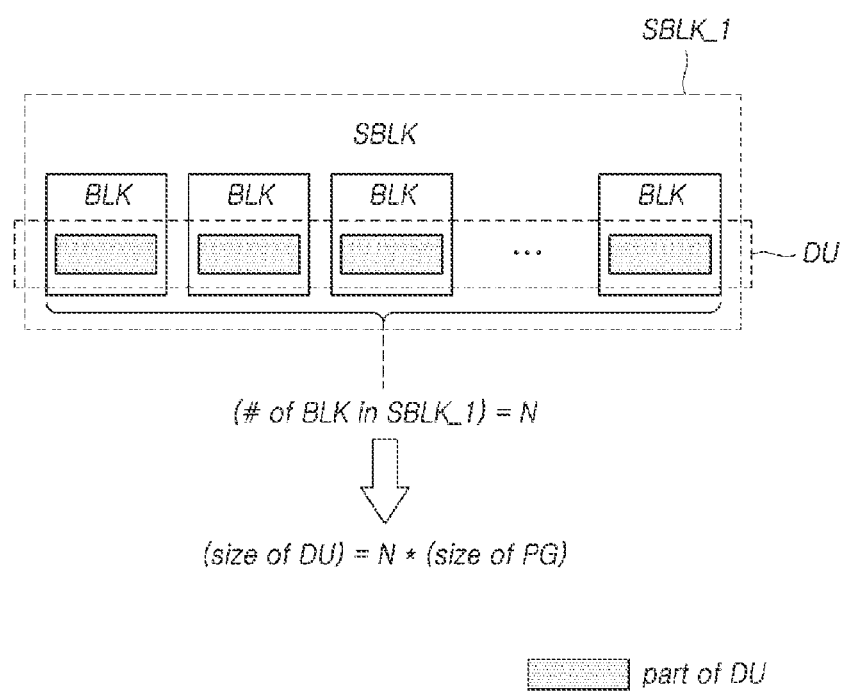
FIG. 11 illustrates an example for the memory system determining the size of a valid data unit according to embodiments of the present disclosure.

FIG. 11 illustrates an example for the memory system 100 determining the size of a valid data unit DU according to embodiments of the present disclosure.

Referring to FIG. 11, the memory controller 120 of the memory system 100 may determine the size of the valid data unit DU in proportion to the size of the first super memory block SBLK_1. In this case, the size of the first super memory block SBLK_1 means the size of data that can be stored in the first super memory block SBLK_1, that is, the storage capacity.

The size of the first super memory block SBLK_1 may be determined based on the number of memory blocks BLK included in the first super memory block SBLK_1.

For example, the memory device 110 includes 4 memory dies (not shown) and each of the 4 memory dies (not shown) Includes 4 planes (not shown). In this case, the first super memory block SBLK_1 may include 16(=4*4) memory blocks BLK. The size of the first super memory block SBLK_1 may be 16 times the size of the memory block BLK.

For another example, the memory device 110 includes 8 memory dies (not shown) and each of the 4 memory dies (not shown) includes 4 planes (not shown). In this case, the first super memory block SBLK_1 may include 32(=8*4) memory blocks BLK. The size of the first super memory block SBLK_1 may be 32 times the size of the memory block BLK, and the size of the valid data unit DU may be twice the size of the valid data unit when the first super memory block SBLK_1 includes 16 memory blocks BLK.

When reading the valid data unit DU from the second super memory block SBLK_2, the memory controller 120 may read it in an interleaved manner.

When the memory controller 120 reads the valid data unit DU from the second super memory block SBLK_2 in an interleaved manner, this means that the memory controller 120 reads portions of the valid data unit DU distributed and stored in the memory blocks BLK included in the second super memory block SBLK_1 in parallel.

For example, when the first super memory block SBLK_1 includes 16 memory blocks BLK, the size of the valid data unit DU is 16 times the size of the page PG, and a portion of the valid data unit DU (each having a size of 1 page) may be stored in each of the 16 memory blocks BLK. The memory controller 120 may read the valid data unit DU faster by reading portions of the valid data unit DU in parallel from the 16 memory blocks BLK.

Figure 12:
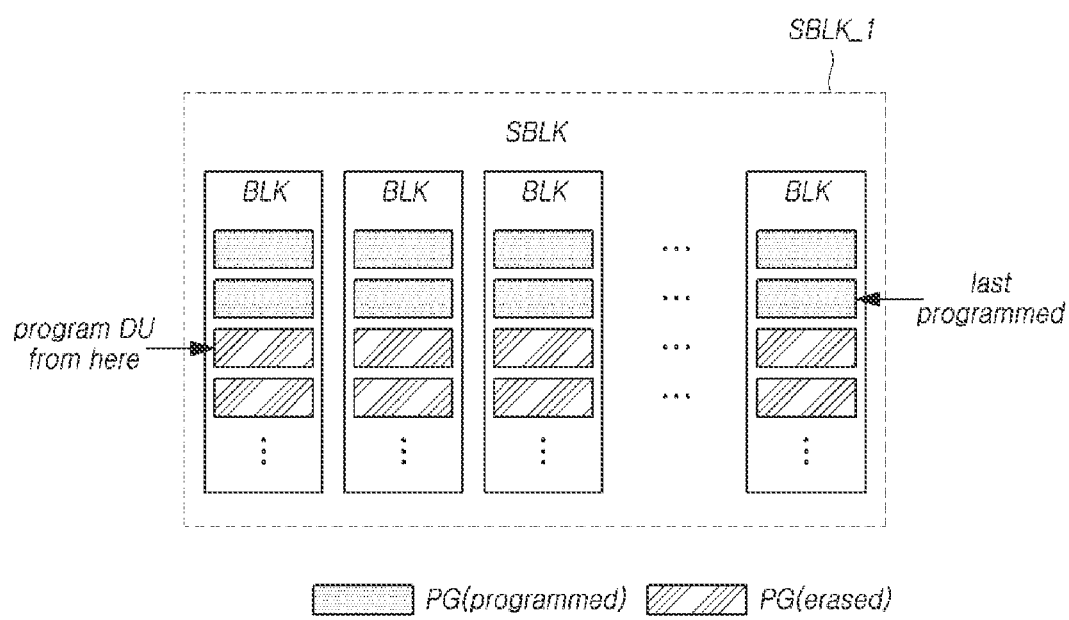
FIG. 12 illustrates an example of a location where the memory system programs data units into the first super memory block according to embodiments of the present disclosure.

FIG. 12 illustrates an example of a location where the memory system 100 programs valid data units DU into the first super memory block SBLK_1 according to embodiments of the present disclosure.

Referring to FIG. 12, the memory controller 120 of the memory system 100 may program the valid data unit DU from a position next to a position at which data was last programmed in the first super memory block SBLK_1.

That is, the memory controller 120 may program the valid data unit DU from a position next to a position at which data was last programmed in the first super memory block SBLK_1 so that an erased page does not exist at a position next to a position at which data was last programmed in the first super memory block SBLK_1.

Figure 13:
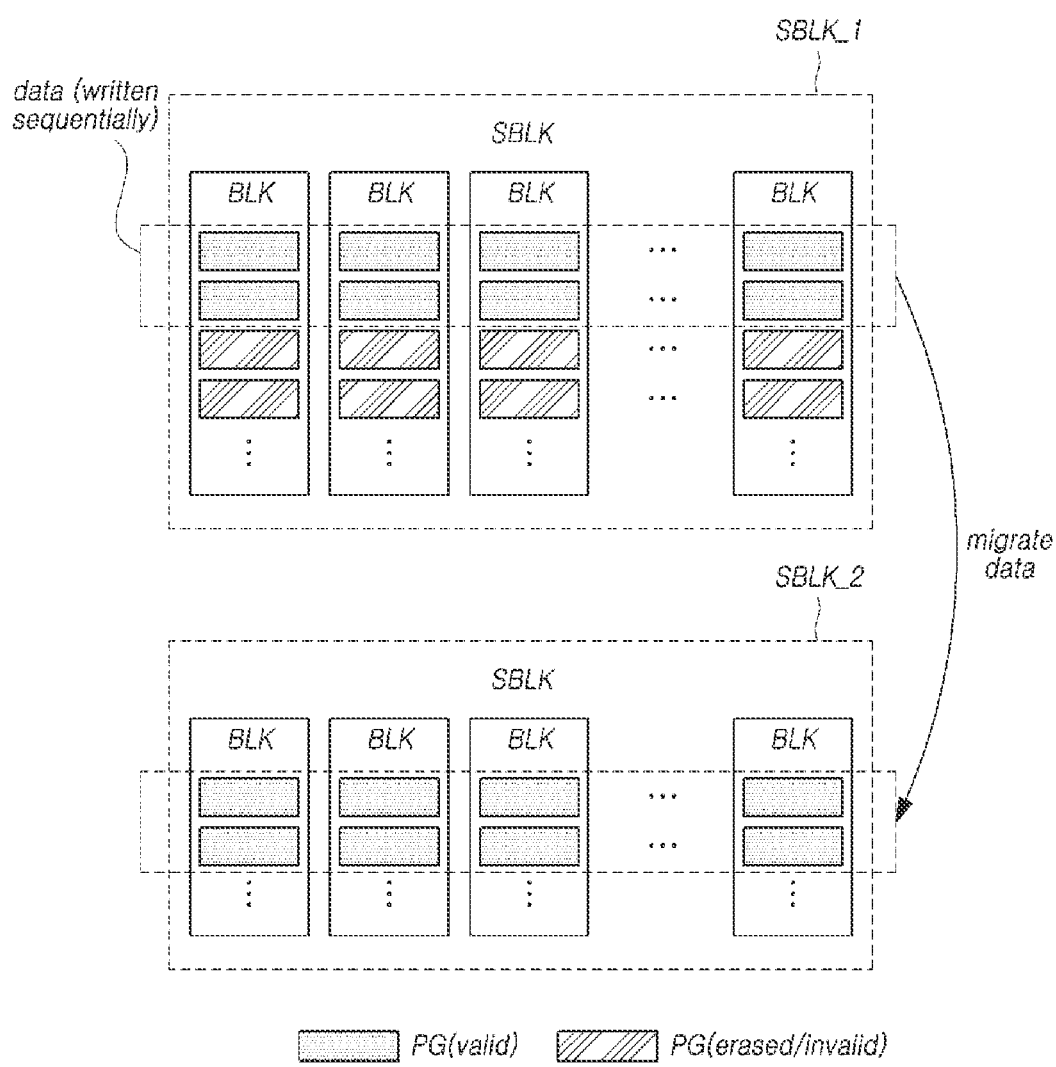
FIG. 13 illustrates an example for the memory system determining the target operation based on the first super memory block according to embodiments of the present disclosure.

FIG. 13 illustrates an example for the memory system 100 determining the target operation based on the first super memory block SBLK_1 according to embodiments of the present disclosure.

Referring to FIG. 13, when the first super memory block SBLK_1 is a super memory block in which data is sequentially programmed, the memory controller 120 may determine the target operation as the operation of migrating all valid data stored in the first super memory block SBLK_1 to the second super memory block SBLK_2. In this case, the target operation may be determined regardless of the number of erased pages included in the first super memory block SBLK_1.

When the first super memory block SBLK_1 is a super memory block in which data is sequentially programmed, it means that data is programmed into the first super memory block SBLK_1 according to the specific order of logical address (e.g. ascending order or descending order of logical address). In this case, the operation of randomly programming data in the first super memory block SBLK_1 is prohibited.

If data is sequentially programmed in the first super memory block SBLK_1, logical addresses corresponding to data stored in the first super memory block SBLK_1 may be included in a continuous logical address section.

Moreover, if Zoned Namespace (ZNS) technology is applied to the memory system 100, the first super memory block SBLK_1 may be a super memory block in which data is sequentially programmed.

As such, when the first super memory block SBLK_1 is a super memory block in which data is sequentially programmed, the number of erased pages included in the first super memory block SBLK_1 may be changed if data stored in another super memory block is migrated to the first super memory block SBLK_1. It may cause a problem in which a performance requirement for the super memory block is not satisfied.

Accordingly, the memory controller 120 may ensure data reliability and satisfy the performance requirement for super memory block by migrating all valid data stored in the first super memory block SBLK_1 to the second super memory block SBLK_2. In this case, the number of erased pages included in the second super memory block SBLK_2 may be greater than or equal to the number of erased pages included in the first super memory block SBLK_1.

Furthermore, data migrated to the second super memory block SBLK_2 may also be sequentially programmed into the second super memory block SBLK_2.

The memory controller 120 may set, after the target operation is executed, the second super memory block SBLK_2 as a super memory block in which data is sequentially programmed according to an order of a logical address like the first super memory block SBLK_1. In this case, the operation of randomly programming data in the second super memory block SBLK_2 is prohibited.

Figure 14:
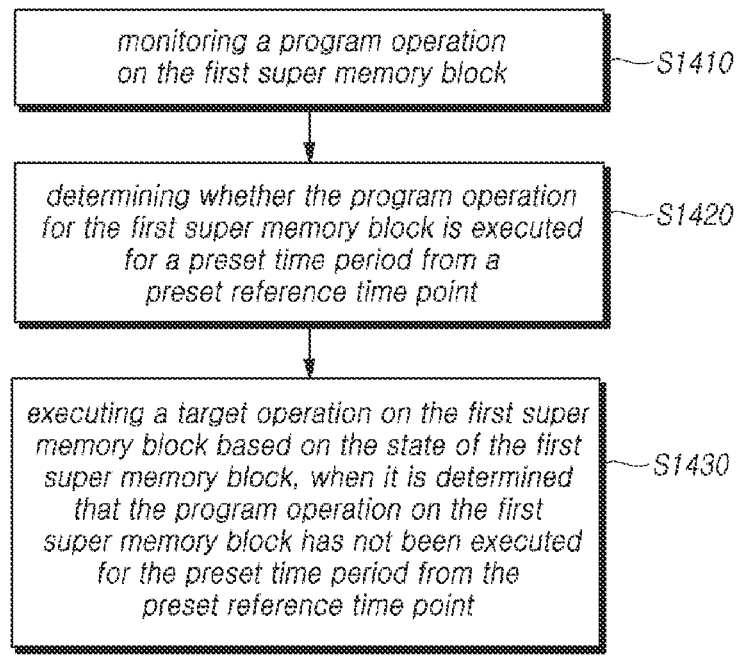
FIG. 14 illustrates an operating method of the memory system according to embodiments of the present disclosure.

FIG. 14 illustrates an operating method of the memory system 100 according to embodiments of the present disclosure.

Referring to FIG. 14, the operating method of the memory system 100 may include monitoring a program operation on the first super memory block SBLK_1 among a plurality of super memory blocks SBLK (S1410). In this case, each of the plurality of super memory blocks SBLK may include one or more of the plurality of memory blocks BLK. In addition, each of the plurality of memory blocks BLK may include a plurality of pages PG.

The operating method of the memory system 100 may include determining whether the program operation for the first super memory block SBLK_1 is executed for a preset time period from a preset reference time point (S1420).

In this case, the reference time point may be a time point at which the memory system 100 enters an idle state or a time point at which the memory system 100 enters a low power mode.

And the operating method of the memory system 100 may include executing a target operation on the first super memory block SBLK_1 based on the state of the first super memory block SBLK_1 when it is determined that the program operation on the first super memory block SBLK_1 has not been executed for the preset time period from the preset reference time point (S1430).

In this case, the target operation may be determined as one of i) an operation of migrating a valid data unit DU of a preset size stored in a second super memory block SBLK_2 among the plurality of super memory blocks SBLK to the first super memory block SBLK_1, ii) an operation of migrating all or a part of valid data stored in the second super memory block SBLK_2 to all erased pages included in the first super memory block SBLK_1, and iii) an operation of migrating all valid data stored in the first super memory block SBLK_1 to the second super memory block SBLK_2.

For example, the target operation may be determined as the operation of migrating a valid data unit DU in the second super memory block SBLK_2 to the first super memory block SBLK_1, when the number of erased pages included in the first super memory block SBLK_1 is greater than or equal to a set threshold number of pages. And the target operation may be determined as the operation of migrating all or a part of valid data stored in the second super memory block SBLK_2 to all erased pages included in the first super memory block SBLK_1, when the number of erased pages included in the first super memory block SBLK_1 is less than the threshold number of pages.

In this case, the size of the valid data unit DU may be determined in proportion to the size of the first super memory block SBLK_1. The size of the first super memory block SBLK_1 may be determined based on the number of memory blocks BLK included in the first super memory block SBLK_1.

When the valid data unit DU stored in the second super memory block SBLK_2 is migrated to the first super memory block, the valid data unit DU may be read from the second super memory block SBLK_2 by an interleaved manner.

The valid data unit DU may be programmed from a position next to a position at which data was last programmed in the first super memory block SBLK_1.

For another example, when the first super memory block SBLK_1 is a super memory block in which data is sequentially programmed according to an order of a logical address, the target operation may be determined as the operation of migrating all valid data stored in the first super memory block SBLK_1 to the second super memory block SBLK_2. In this case, the second super memory block SBLK_2 may be set, after the target operation is executed, as a super memory block in which data is sequentially programmed according to an order of a logical address.

Figure 15:
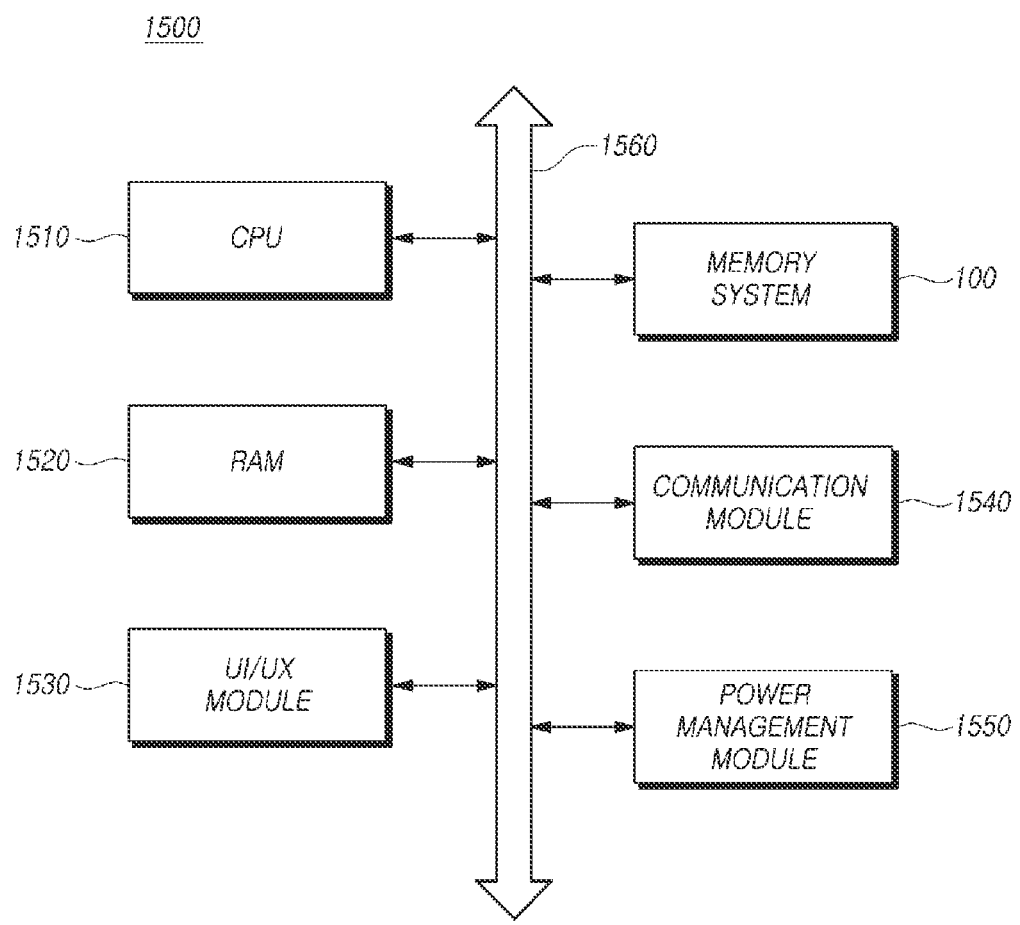
FIG. 15 is a diagram illustrating the configuration of a computing system based on some embodiments of the disclosed technology.

FIG. 15 is a diagram illustrating the configuration of a computing system 1500 based on an embodiment of the disclosed technology.

Referring to FIG. 15, the computing system 1500 based on an embodiment of the disclosed technology may include: a memory system 100 electrically connected to a system bus 1560; a CPU 1510 configured to control the overall operation of the computing system 1500; a RAM 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. A memory system comprising:
   a memory device including a plurality of memory blocks each including a plurality of pages; and
   a memory controller configured to:
   monitor a program operation on a first super memory block among a plurality of super memory blocks each including at least one of the plurality of memory blocks, and
   execute a target operation on the first super memory block based on the state of the first super memory block when it is determined that the program operation on the first super memory block has not been executed for a preset time period from a preset reference time point,
   wherein the memory controller is further configured to set the reference time point as a time point at which the memory system enters an idle state or a low power mode.

2. The memory system of claim 1, wherein the memory controller is further configured to determine, as the target operation, one of an operation of migrating, to the first super memory block, a valid data unit of a preset size stored in a second super memory block among the plurality of super memory blocks, an operation of migrating, to all erased pages included in the first super memory block, all or a part of valid data stored in the second super memory block, and an operation of migrating, to the second super memory block, all valid data stored in the first super memory block.

3. The memory system of claim 2, wherein the memory controller determines, as the target operation:
   the operation of migrating, to the first super memory block, the valid data unit in the second super memory block when a number of erased pages included in the first super memory block is greater than or equal to a threshold number, and
   the operation of migrating, to all erased pages included in the first super memory block, all or the part of valid data stored in the second super memory block when the number of erased pages included in the first super memory block is less than the threshold number.

4. The memory system of claim 3,
   wherein the memory controller is further configured to determine the preset size of the valid data unit in proportion to a size of the first super memory block, and
   wherein the size of the first super memory block is determined based on a number of memory blocks included in the first super memory block.

5. The memory system of claim 4, wherein the memory controller executes, as the target operation, the operation of migrating the valid data unit from the second super memory block to the first super memory block by reading the valid data unit from the second super memory block by an interleaved manner.

6. The memory system of claim 3, wherein the memory controller executes, as the target operation, the operation of migrating the valid data unit from the second super memory block to the first super memory block by programming the valid data unit from a position next to a most recently programmed position in the first super memory block.

7. The memory system of claim 2, wherein the memory controller determines, as the target operation, the operation of migrating, to the second super memory block, all valid data stored in the first super memory block when the first super memory block is a super memory block in which data is sequentially programmed according to an order of a logical address.

8. The memory system of claim 7, wherein the memory controller is further configured to set, after the executing of the target operation, the second super memory block as a super memory block in which data is sequentially programmed according to an order of a logical address.

9. The memory system of claim 1, wherein the memory controller is further configured to program, after the executing of the target operation, data requested to be written from outside the memory system into an erased page included in the first super memory block.

10. An operating method of a memory system, the operating method comprising:
    monitoring a program operation on a first super memory block among a plurality of super memory blocks each including at least one of a plurality of memory blocks each including a plurality of pages;
    determining whether the program operation for the first super memory block is executed for a preset time period from a preset reference time point; and
    executing a target operation on the first super memory block based on the state of the first super memory block when it is determined that the program operation on the first super memory block has not been executed for the preset time period from the preset reference time point,
    wherein the reference time point is a time point at which the memory system enters an idle state or a low power mode.

11. The operating method of claim 10, further comprising determining, as the target operation, one of an operation of migrating, to the first super memory block, a valid data unit of a preset size stored in a second super memory block among the plurality of super memory blocks, an operation of migrating, to all erased pages included in the first super memory block, all or a part of valid data stored in the second super memory block, and an operation of migrating, to the second super memory block, all valid data stored in the first super memory block.

12. The operating method of claim 11, wherein the determining includes determining, as the target operation,
    the operation of migrating, to the first super memory block, the valid data unit in the second super memory block when a number of erased pages included in the first super memory block is greater than or equal to a threshold number, and
    the operation of migrating, to all erased pages included in the first super memory block, all or the part of valid data stored in the second super memory block when the number of erased pages included in the first super memory block is less than the threshold number.

13. The operating method of claim 12,
further comprising determining the preset size of the valid data unit in proportion to a size of the first super memory block, and
wherein the size of the first super memory block is determined based on a number of memory blocks included in the first super memory block.

14. The operating method of claim 13, wherein the operation of migrating the valid data unit from the second super memory block to the first super memory block, as the target operation, includes reading the valid data unit from the second super memory block by an interleaved manner.

15. The operating method of claim 12, wherein the operation of migrating the valid data unit from the second super memory block to the first super memory block, as the target operation, includes programming the valid data unit from a position next to a most recently programmed position in the first super memory block.

16. The operating method of claim 11, wherein the determining includes determining, as the target operation, the operation of migrating, to the second super memory block, all valid data stored in the first super memory block when the first super memory block is a super memory block in which data is sequentially programmed according to an order of a logical address.

17. The operating method of claim 16, further comprising setting, after the executing of the target operation, the second super memory block as a super memory block in which data is sequentially programmed according to an order of a logical address.

18. The operating method of claim 10, further comprising programming, after the executing of the target operation, data requested to be written from outside the memory system into an erased page included in the first super memory block.

* * * * *